United States Patent [19]

Kawai et al.

[11] Patent Number: 4,475,388
[45] Date of Patent: Oct. 9, 1984

[54] THERMAL FLOWMETER WITH TEMPERATURE COMPENSATION

[75] Inventors: Hisasi Kawai, Toyohashi; Norihito Tokura, Aichi; Tokio Kohama, Nishio; Kenji Kanehara, Okazaki; Takayoshi Ito; Kazutaka Hasegawa, both of Toyota, all of Japan

[73] Assignees: Nippon Soken, Inc., Nishio; Toyota Jidosha Kabushiki Kaisha, Toyota, both of Japan

[21] Appl. No.: 433,411

[22] Filed: Oct. 7, 1982

[30] Foreign Application Priority Data

Jan. 11, 1982 [JP] Japan .................................. 57-1702

[51] Int. Cl.$^3$ .............................................. G01F 1/68
[52] U.S. Cl. ...................................... 73/204; 73/118.2
[58] Field of Search .................... 73/204, 118, 118 A; 364/510

[56] References Cited

U.S. PATENT DOCUMENTS 3,891,391  6/1975  Boone ................................... 73/204
3,987,788 10/1976  Emil ................................... 73/204 X
4,276,773  7/1981  Kawai et al. .......................... 73/204

Primary Examiner—Herbert Goldstein
Assistant Examiner—Brian R. Tumm
Attorney, Agent, or Firm—Cushman, Darby & Cushman

[57] ABSTRACT

A method for measuring the flow rate of fluid such as liquified petroleum gas fuel for an automobile fuel. A signal of the fluid flow rate and a signal of the fluid temperature are produced by using the signals from an electric heater and a first, second, and third temperature-dependent resistors in a signal processing circuit. The produced signals are supplied to a computer circuit to carry out modification, linearization, and multiplication by a conversion constant for linearization which is corrected regarding temperature characteristic. The result of calculation in the computer circuit is displayed on a display device.

5 Claims, 11 Drawing Figures

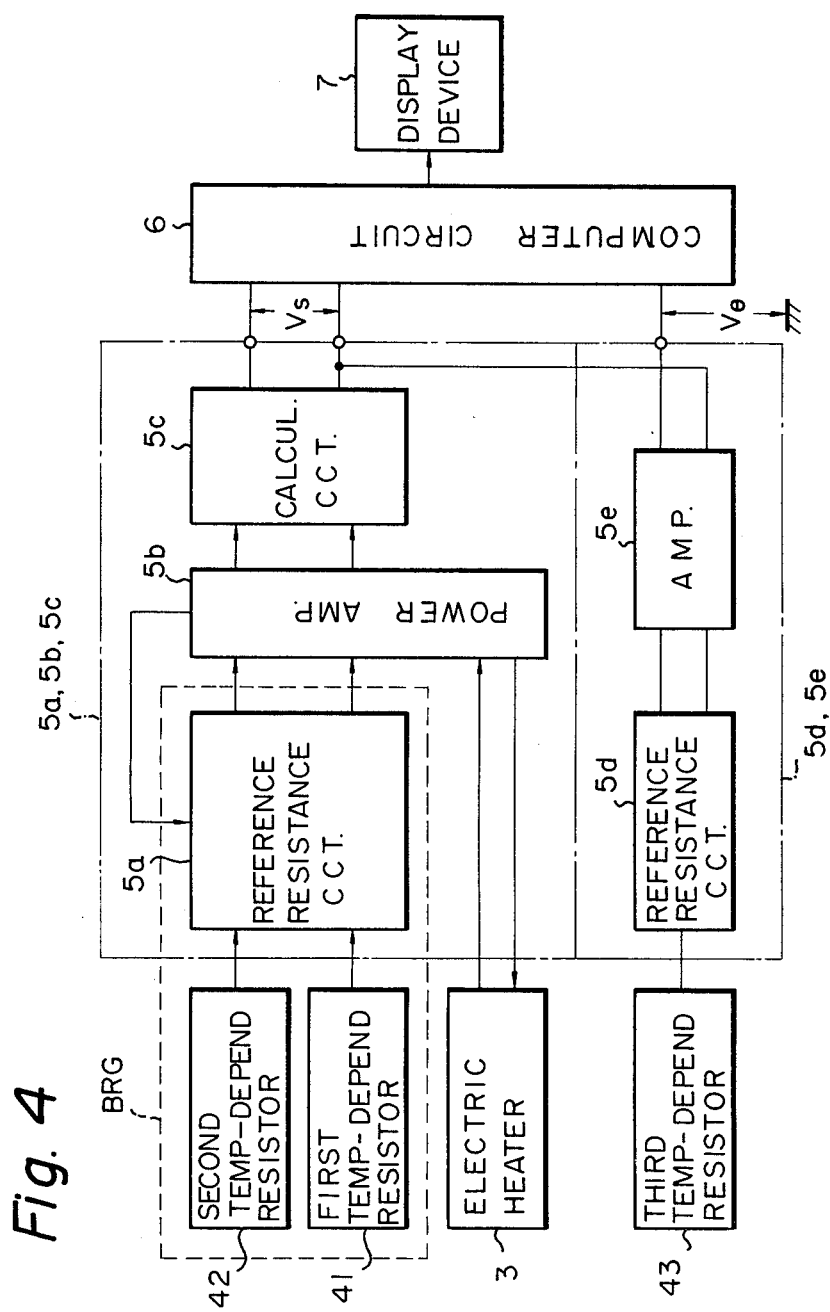

THERMAL FLOWMETER WITH TEMPERATURE COMPENSATION

BACKGROUND OF THE INVENTION

1. Field of the Invention

The present invention relates to a method and a device for measuring the flow rate of fluid. The method and device of the present invention are suitably used for measuring the flow rate of liquified petroleum gas (LPPG) used for an automobile.

2. Description of the Prior Art

In the prior art device for measuring the flow rate of a gas, a heater coil and temperature sensing coils are arranged outside the flow rate measuring pipe through which the gas to be measured is passing. The heater coil is located between the upstream temperature sensing coil and the downstream temperature sensing coil. The heat produced from the heater coil and supplied to the flowing gas creates a temperature difference between the upstream gas and the downstream gas. The upstream gas temperature is detected by the upstream sensing coil, and the downstream gas temperature is detected by the downstream sensing coil. The mass flow rate of the gas through the flow rate measuring pipe is measured from the difference between the temperatures detected by the upstream and downstream sensing coils.

A problem with the prior art device is that the speed of response to changes in the flow rate of the gas is relatively slow, e.g., 3 seconds. Another problem is that the inner diameter of the flow rate measuring pipe through which the gas to be measured passes is relatively small, e.g., 0.7 mm, hence the passage of the gas through the flow rate measuring pipe is susceptible to dust, contamination, or the like. The problem is particularly serious in the case of LPG, which contains tar impurities apt to be deposited on the inner wall of the flow rate measuring pipe, often blocking the passage of the LPG.

A further problem is that the specific heat of LPG changes in accordance with the change of temperature, yet no correction is carried out with respect to the change of the specific heat of LPG due to the temperature.

SUMMARY OF THE INVENTION

It is the object of the present invention to provide an improved method and device for measuring the flow rate of fluid by which the speed of response to changes of the flow rate of the gas is increased, the measurement is not affected by the temperature of the gas, and the flow rate measuring pipe is not affected by dust, contamination, or the like.

In accordance with an aspect of the present invention, there is provided a method for measuring the flow rate of fluid comprising the steps of: producing a signal of the fluid flow rate by using the signals from first and second temperature-dependent resistors and an electric heater arranged in a fluid flow rate measuring pipe; producing a signal of the fluid temperature by using the signal from a third temperature-dependent resistor arranged in the fluid flow rate measuring pipe; modifying the produced signal of the fluid-flow rate in accordance with the temperature characteristic of the produced signal; converting the modified signal of the fluid flow to realize the linearized characteristic of the signal; and multiplying the converted modified signal of the fluid flow by a conversion constant, the conversion constant being corrected in accordance with the temperature characteristic thereof.

In accordance with another aspect of the present invention, there is provided a device for measuring the flow rate of a fluid comprising: a flow rate measuring pipe for passing the fluid to be measured, an electric heater arranged in the pipe, a first temperature-dependent resistor arranged in the pipe located at the downstream side of the electric heater, a second temperature-dependent resistor arranged in the pipe located at the upstream side of the electric heater, a third temperature-dependent resistor arranged in the pipe outside the space between the first and second temperature-dependent resistors, a first measurement circuit responsive to the signals from the first and second temperature-dependent resistors and the electric heater for producing a signal representing the fluid flow rate, a second measurement circuit responsive to the signal from the third temperature-dependent resistor for producing a signal representing the fluid temperature, and a computer device responsive to the output signals of the first and second measurement circuits for carrying out a modification and a linearization of the output signal of the first measurement circuit, a correction of a conversion constant regarding temperature characteristic, and a multiplication of the linearized modified output signal of the first measurement circuit by the corrected conversion constant.

BRIEF DESCRIPTION OF THE DRAWINGS

In the drawings

FIG. 4 illustrates the fundamental structure of the signal processing circuit in the device of FIG. 1;

DESCRIPTION OF THE PREFERRED EMBODIMENT

Figure 1:
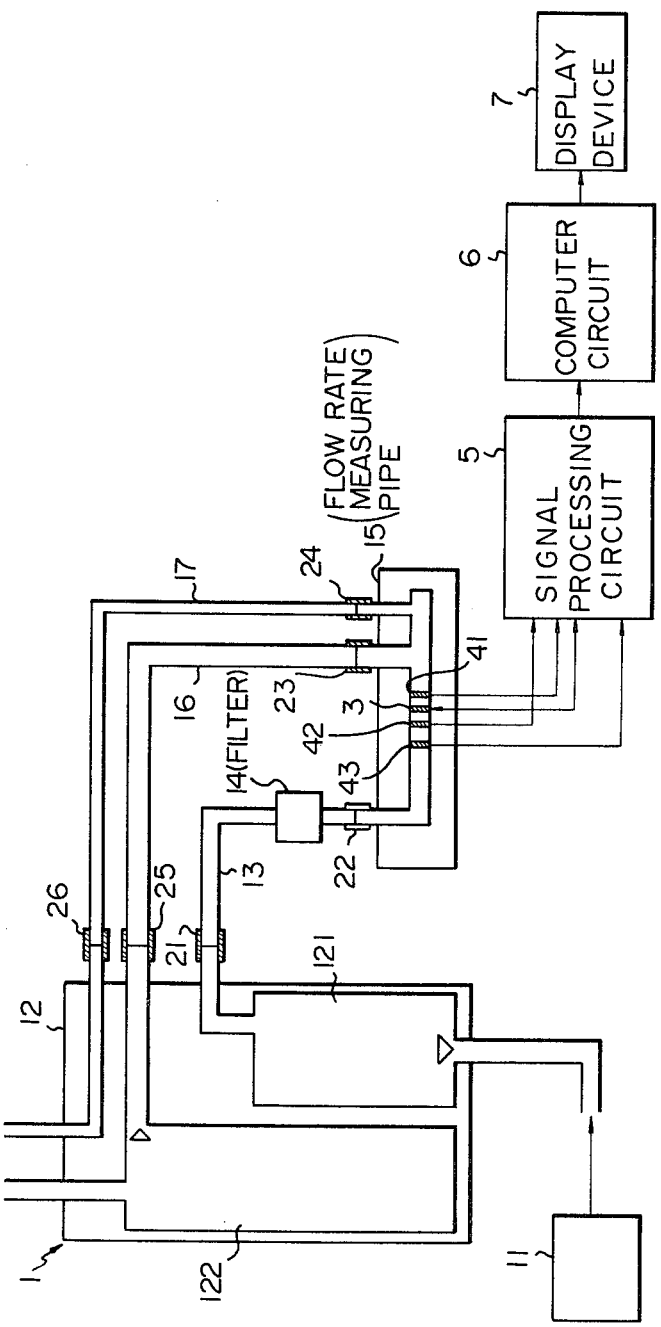
FIG. 1 illustrates a device for measuring the flow rate of fluid according to an embodiment of the present invention.

A device for measuring the flow rate of fluid according to an embodiment of the present invention is illustrated in FIG. 1. The device of FIG. 1 is used for measuring the flow rate of LPG used as fuel for an automobile. The device of FIG. 1 includes a regulator 12 for a fuel supply system 1. The regulator 12 has a primary pressure reduction chamber 121 in which the pressure of the LPG fuel from a fuel tank 11 is reduced and the LPG fuel is gasified. The outlet of the primary pressure reduction chamber 121 is connected through a joint 21 to a pipe 13 and a filter 14. The inlet of a flow rate measuring pipe 15 is connected to the filter 14 through a joint 22. An electric heater 3, a first temperature-dependent resistor 41, a second temperature-dependent resistor 42, and a third temperature-dependent resistor 43 are provided in the flow rate measuring pipe 15.

A first outlet of the flow rate measuring pipe 15 is connected through a pipe 16 to the inlet of a secondary pressure reduction chamber 122 of the regulator 12. A second outlet of the flow rate measuring pipe 15 is connected through a pipe 17 to the inlet of a slow automobile speed fuel supply portion of the regulator 12. The secondary pressure reduction chamber 122 of the regulator 12 is connected to a main fuel supply system ("main" system) of a carburetor (not shown). The outlet of the slow automobile speed fuel supply portion of the regulator 12 is connected to the slow automobile speed fuel supply system ("slow" system) of the carburetor.

The device of FIG. 1 also includes a signal processing circuit 5, a computer circuit 6, and a display device 7.

The gasified LPG from the primary pressure reduction chamber 121 of the regulator 12 passes through the filter 14, where dust is removed, and is supplied to the flow rate measuring pipe 15. The flow rate of the gas at the flow rate measuring pipe 15 is measured by using the electric heater 3, the first, second, and third temperature-dependent resistors 41, 42, 43, and the signal processing circuit 5. The output signal of the signal processing circuit 5 is supplied to the computer circuit 6 where the linearization and the temperature correction are carried out. The output signal of the computer circuit 6 is supplied to the display device 7. After passing through the flow rate measuring pipe 15, the LPG gas is supplied to the input of the "main" system and the input of the "slow" system of the regulator 12. The pressure of the LPG supplied to the "main" system of the regulator 12 is reduced in the secondary pressure reduction chamber 122. The pressure reduced LPG is then supplied to the "main" system of the carburetor.

Figure 2:
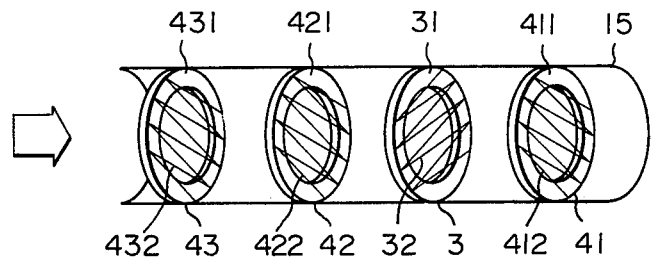
FIG. 2 illustrates the electric heater and the temperature-dependent resistors in the flow rate measuring chamber in the device of FIG. 1.

The electric heater 3, the first, second, and third temperature-dependent resistors 41, 42, and 43 in the flow rate measuring pipe 15 are illustrated in FIG. 2. The electric heater 3 consists of platinum resistance wire 32 arranged in a zigzag manner on a ceramic ring 31. The first temperature-dependent resistor 41 is located at the downstream side of and adjacent to the electric heater 3. The second temperature-dependent resistor 42 is located at the upstream side of the electric heater 3. The third temperature-dependent resistor 43 is located at the upstream side of the second temperature-dependent resistor 42.

The first, second, and third temperature-dependent resistors 41, 42, 43 consist also of platinum resistance wires 412, 422, 432 arranged in a zigzag manner on ceramic rings 41, 42, 43, respectively. The platinum resistance wires 412, 422, 432 have the same resitance-temperature characteristic.

Figure 3:
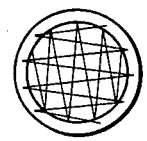
FIG. 3 illustrates the arrangement of the platinum resistance wires in the device of FIG. 2.

The zigzag arrangement of the platinum resistance wire 412 of the first temperature-dependent resistor 41 is rotated 90° from that of the platinum resistance wire 32 of the electric heater 3. The view along the longitudinal axis of the flow rate measuring pipe 15 is therefore that of FIG. 3. The first temperature-dependent resistor 41 is therefore prevented from being affected by slight variation in heat distribution in the flow rate measuring pipe 15.

Referring to FIG. 4, the electric heater 3 and the first and second temperature-dependent resistors are connected to a reference resistance circuit 5a of the signal processing circuit 5. A first portion 5a, 5b, 5c of the signal processing circuit 5 determines the flow rate of the intake gas and produces a corresponding signal.

The first portion of the signal processing circuit 5 includes a reference resistance circuit 5a, a voltage control circuit 5b, and the calculation circuit 5c. The reference resistance circuit 5a and the first and second temperature-dependent resistors 41, 42 constitute a bridge circuit BRG. The voltage control circuit 5b controls the voltages applied to the bridge circuit BRG and the electric heater 3 in accordance with the voltage across the points br1 and br2 (FIG. 6), diagonal points of the bridge circuit BRG. The output signal of the calculation circuit 5c is supplied to the computer circuit 6.

Figure 5:
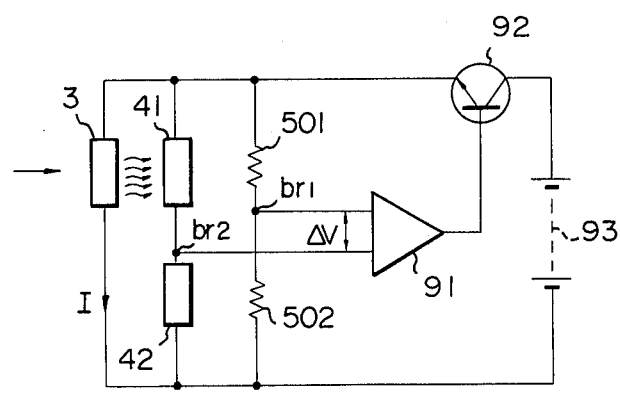
FIG. 5 illustrates a circuit diagram for explaining the principle of the operation of the device of FIG. 1.

The principle of determination of the flow rate by the electric heater 3, the first and second temperature-dependent resistors 41, 42, the reference resistance circuit 5a, the voltage control circuit 5b, and the calculation circuit 5c is explained with reference to the circuit diagram of FIG. 5. The circuit of FIG. 5 includes an amplifier 91, a transistor 92, and a battery 93. The voltage supplied to the electric heater 3 and the bridge circuit BRG is controlled by the amplifier 91 and the transistor 92 so as to keep the potential difference $\Delta V$ between the points br1 and br2 constant. In this case, the relationship between the current I passing through the electric heater 3 and the weight flow rate G of the LPG gas is expressed as follows:

$$G = \frac{K}{C_P \cdot \Delta V} \cdot I^n \qquad (1)$$

$$n = 2 \text{ to } 3 \qquad (2)$$

In equation (1), K is a proportional constant of the circuit, $C_p$ is the specific heat under constant pressure of the LPG, and $\Delta V$ is the potential difference between the terminal pair br1, br2 of the bridge circuit BRG. The values K and $\Delta V$ in equation (1) are constant. The value $C_p$ for LPG varies to a great extent in accordance with temperature, although $C_p$ for air does not vary in accordance with temperature. The exponent n of the value I of the current varies between 2 and 3, because the exponent n varies in accordance with the variation in the structure of the flow rate measuring pipe 15, the electric heater 3, and the first and the second temperature-dependent resistors 41, 42.

Referring back to FIG. 4, the output signal of the third temperature-dependent resistor 43 is supplied to the second portion including a reference resistance circuit 5d and an amplifier 5e of the signal processing circuit 5. In the reference resistance circuit 5d and the amplifier 5e, a signal corresponding to the temperature is obtained. The obtained signal is supplied to the computer circuit 6. The third temperature-dependent resistor 43 and the reference resistance circuit 5d constitute a bridge circuit.

The computer circuit 6 carries out the linearization of signals and the correction of the gas temperature, based on the signal supplied from the amplifier 5e, and produces the analog signal representing the instantaneous flow rate and the integrated flow rate with respect to a predetermined period. The produced signal is supplied to the display device 7.

Figure 6:
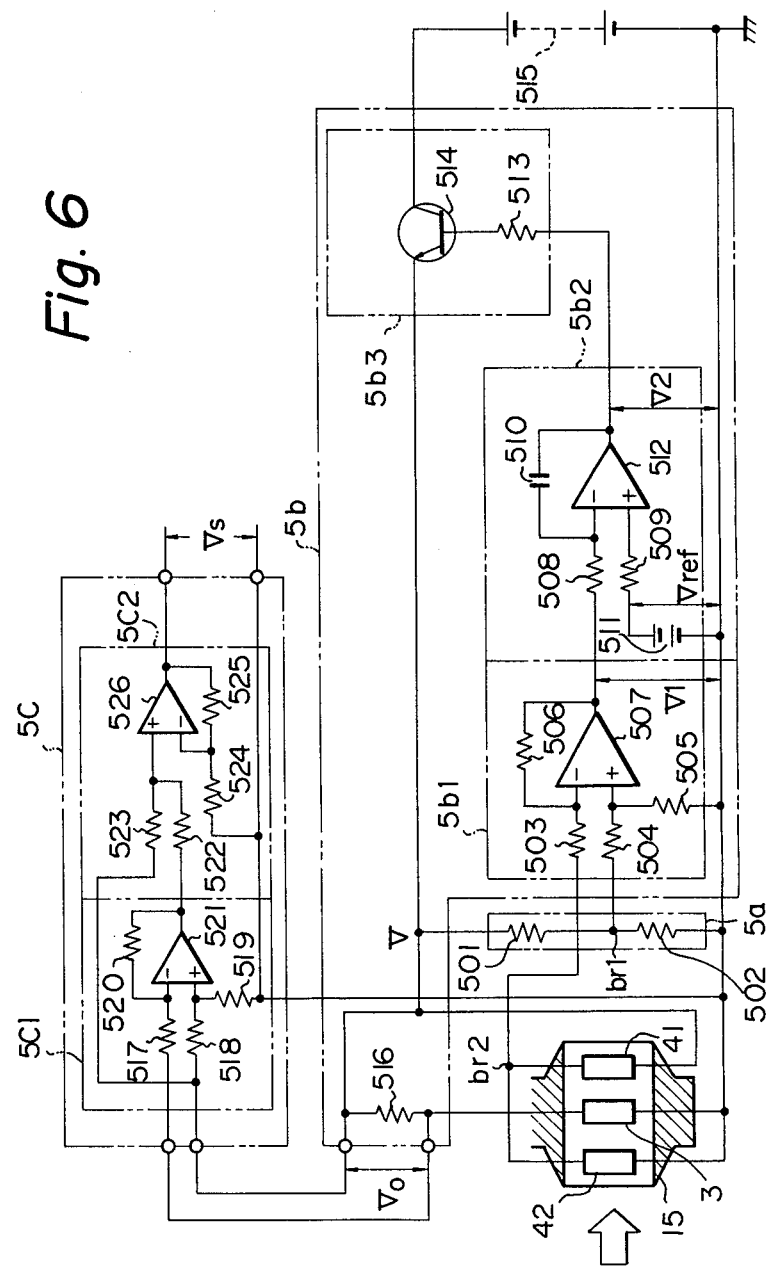
FIG. 6 illustrates the structure of the first portion of the signal processing circuit in the device of FIG. 1.

The structure of the first portion of the signal processing circuit 5 is illustrated in FIG. 6. The reference resistance circuit 5a includes series-connected first reference resistor 501 and second reference resistor 502. The first and second temperature-dependent resistors 41, 42 and the first and second reference resistors 501, 502 constitute a bridge circuit.

The voltage control circuit 5b includes a first differential amplifier circuit 5b1, a second differential amplifier circuit 5b2, a power amplifier circuit 5b3, and an output resistor 516. The first differential amplifier circuit 5b1 includes input resistors 503, 504, a grounded resistor 505, a negative feedback resistor 506, and an operational amplifier 507. The voltage between the points br1 and br2 of the bridge circuit is amplified by the operational amplifier 507. The amplified voltage is produced from the output terminal of the operational amplifier 507.

The second differential amplifier circuit 5b2 includes input resistors 508, 509, a capacitor 510, a reference voltage source 511, and an operational amplifier 512. The difference between the output voltage of the operational amplifier 507 and the reference voltage $V_{ref}$ of the reference voltage source 511 is amplified by the operational amplifier 512. The amplified voltage is produced from the output terminal of the operational amplifier 512. The capacitor 510 prevents oscillation in the circuit. The power amplifier circuit 5b3 includes a resistor 513 and a power transistor 514 to which the power is supplied from the battery 515. The output voltage of the second amplifier circuit 5b2 is amplified by the power amplifier circuit 5b3. The amplified voltage is supplied to the bridge circuit BRG and the electric heater 3. The output resistor 516, connected in series with the electric heater, generates voltage related to the flow rate of the intake gas.

The calculation circuit 5C consists of a differential amplifier circuit 5C1 and an addition amplifier circuit 5C2, the differential amplifier circuit 5C1 includes input resistors 517, 518, a grounded resistor 519, a negative feedback resistor 520, and an operational amplifier 521. The differential amplifier circuit 5C1 amplifies the voltage $V_0$ across the resistor 516. The addition amplifier circuit 5C2 includes resistors 522, 523, a grounded resistor 524, a negative feedback resistor 525, and an operational amplifier 526. The addition amplifier circuit 5C2 adds and amplifies the voltages supplied to the terminals of the resistors 522 and 523. The amplified voltage $V_s$ is produced from the output terminal of the operational amplifier 526.

Figure 7:
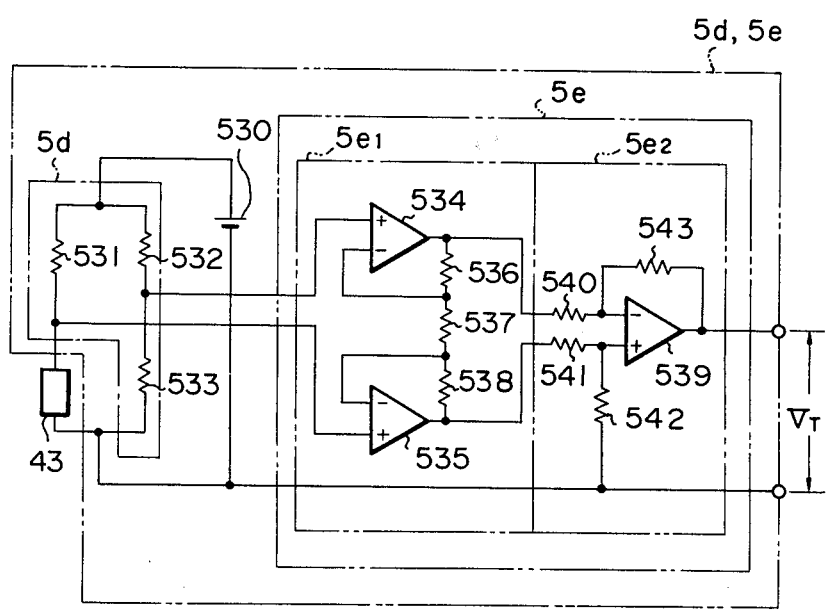
FIG. 7 illustrates the structure of the second portion of the signal processing circuit in the device of FIG. 1.

The structure of the second portion of the signal processing circuit 5 is illustrated in FIG. 7. The reference resistance circuit 5d includes first, second, and third reference resistors 531, 532, 533. The third temperature-dependent resistor 43 and the first, second, and third reference resistors constitute a bridge circuit to which a predetermined voltage is supplied from the power source 530.

The amplifier circuit 5e consists of a first differential amplifier circuit 5e1 and a second differential amplifier circuit 5e2. The first differential amplifier circuit 5e1 includes operational amplifiers 534, 535 and resistors 536, 537, 538 and amplifies the potential difference between the diagonal points of the bridge circuit 43, 531, 532, 533. The amplified voltage is produced across the output terminals of the operational amplifiers 534 and 535.

The second amplifier circuit 5e2 includes an operational amplifier 539, resistors 540, 541, a grounded resistor 542, and a feedback resistor 543 and amplifies the voltage applied across the terminals of the resistors 540 and 541. The amplified voltage $V_T$ is produced from the output terminal of the operational amplifier 539.

Figure 8:
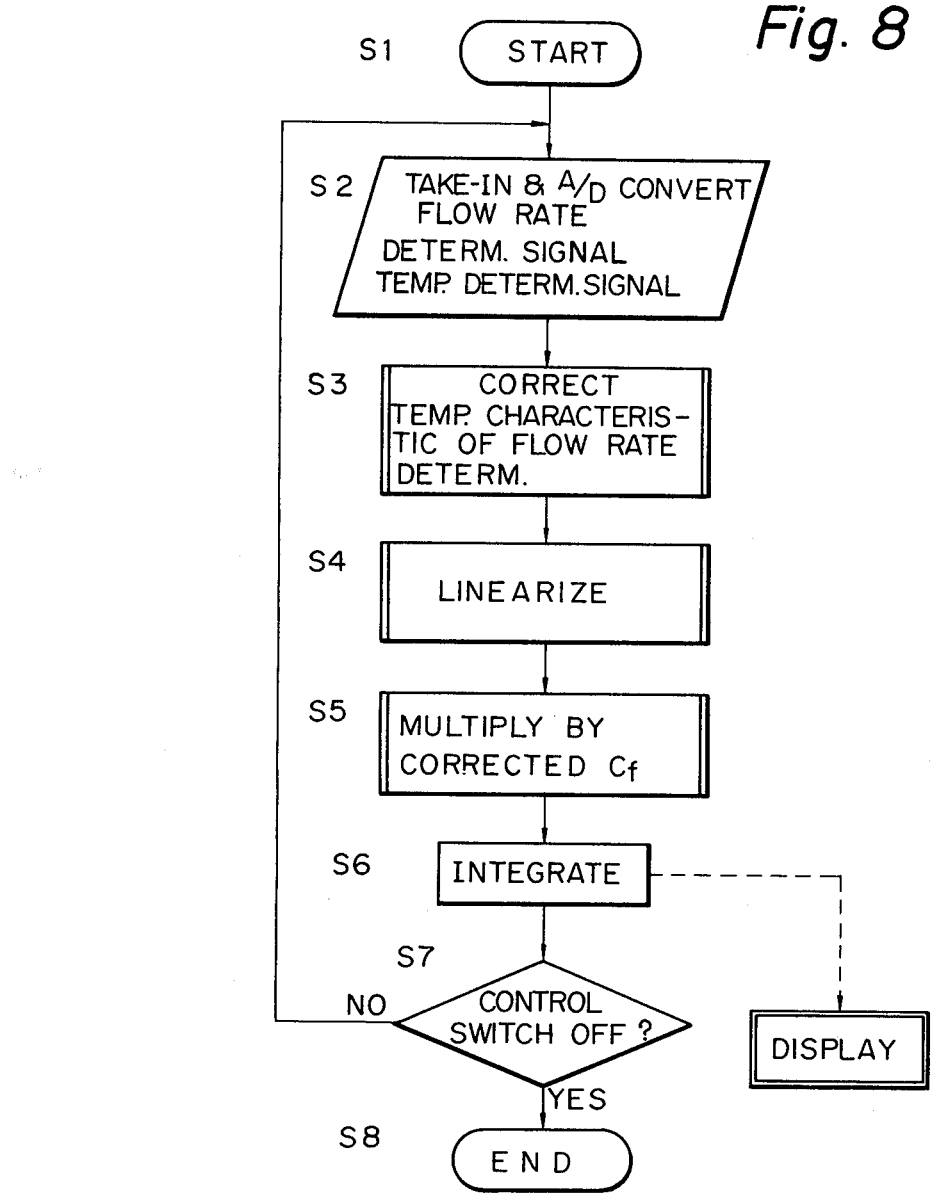
FIG. 8 illustrates a flow chart of the calculation carried out in the computer circuit in the device of FIG. 1.

The calculations carried out in the computer circuit 6 in the device of FIG. 1 are illustrated with reference to the flow chart of FIG. 8. In step S1, the calculation is started when a control switch (not shown) is turned on. In step S2, the analog output signal $V_S$ related to the signal of the gas flow rate obtained from the first portion 5a, 5b, 5c of the signal processing circuit 5 and the analog output signal $V_\theta$ obtained from the second portion 5d, 5e of the signal processing circuit 5 related to the signal of the gas temperature are taken in and converted into a digital signal.

Figure 9:
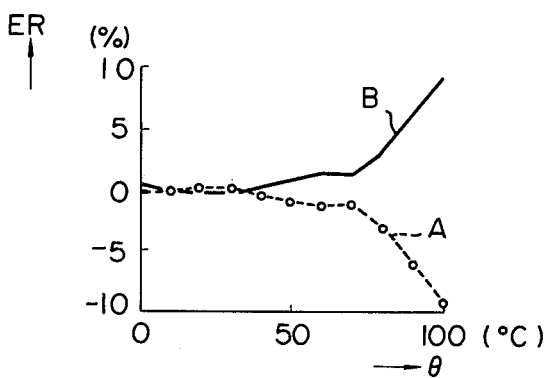
FIGS. 9, 10, and 11 are the graphs representing the operation characteristics of the device of FIG. 1.

In step S3, the error in the signal related to the gas flow rate is corrected and the signal related only to the gas flow rate is obtained. The necessity of the correction is illustrated in the graph of FIG. 9, representing the relationship between the error ER in % and the temperature $\theta$ in °C. The signal related to the gas flow rate has the temperature characteristic A indicated by the broken line. The correction characteristic B indicated by the solid line represents the correction in accordance with the gas temperature $\theta_g$ obtained from $V_{74}$.

Figure 10:
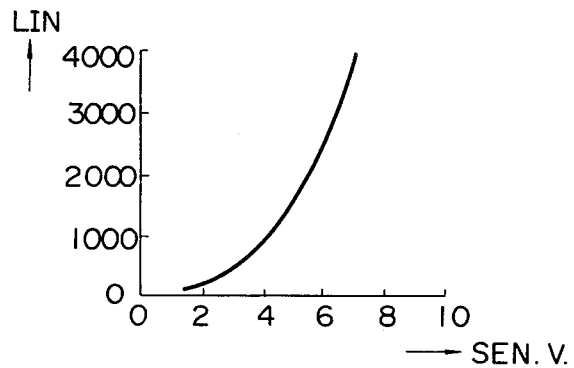

In step S4, the corrected signal obtained in step S3 is converted in accordance with the characteristic of the curve indicated in the graph of FIG. 10, which represents the relationship between the linearized value LIN and the sensor output voltage SEN.V. The curve in the graph of FIG. 10 is drawn under the condition that the temperature is 25° C. and the pressure is 1 atmosphere.

Figure 11:
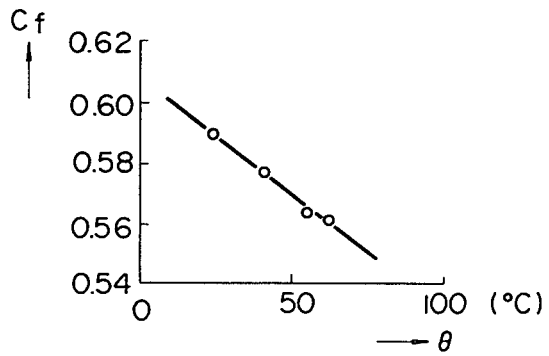

In step S5, correction with respect to the temperature using a conversion constant $C_f$ is carried out. The actual flow rate of the LPG is obtained by multiplying the value by the conversion constant $C_f$. The change of $C_f$ in accordance with the temperature $\theta$ is illustrated in the graph of FIG. 11. The true flow rate $G_f$ of the LPG without error from the change of temperature can be obtained by multiplying the linearized value LIN by the value $C_f$ corresponding to the temperature $\theta_g$ of the LPG obtained from the signal $V_\theta$.

In step S6, the integration of the true flow rate $G_f$ is carried out. The integrated $G_f$ is stored in order to obtain the total flow amount of the LPG during a predetermined period. The integrated $G_f$ is displayed on the display device.

In step S7, the decision as to whether or not the control switch is off is carried out. If the decision is NO, that is, the control switch is in the ON state, the process returns to step S2 and steps S2 through S5 are repeated and the new value is added to the preceding integrated value in step S6. Contrary to this, if the decision is YES, that is, the control switch is in the OFF state, step S7 proceeds to step S8 where the process is stopped. The period from step S2 through S7 is approximately several milliseconds.

In the device of FIG. 1, the response speed can be increased if the structure of the third temperature-dependent resistor 43 is made the same as the structure of the first and the second temperature-dependent resistors 41, 42. This increased response speed is suitable for the case where the temperature of the LPG changes, as in the case of LPG for an automobile.

We claim:

1. A method for measuring the flow rate of fluid comprising the steps of:
   producing a signal corresponding to the fluid flow rate by using the voltages across first and second temperature-dependent resistors and the current through an electric heater arranged in a fluid flow rate measuring pipe;
   producing a signal corresponding to the fluid temperature by using the voltage across a third temperature-dependent resistor arranged in said fluid flow rate measuring pipe;
   modifying said produced signal corresponding to the fluid flow rate in accordance with said signal corresponding to the fluid temperature;
   converting said modified signal corresponding to the fluid flow rate to realize a linearized characteristic; and
   multiplying said converted modified signal corresponding to the fluid flow rate by a conversion constant, said conversion constant being corrected in accordance with the signal corresponding to the fluid temperature.

2. A device for measuring the flow rate of a fluid comprising:
   a flow rate measuring pipe for passing the fluid to be measured,
   an electric heater arranged in said pipe,
   a first temperature-dependent resistor arranged in said pipe located at the downstream side of said electric heater,
   a second temperature-dependent resistor arranged in said pipe located at the upstream side of said electric heater,
   a third temperature-dependent resistor arranged in said pipe outside the space between said first and second temperature-dependent resistors,
   a first measurement circuit responsive to the signals from said first and second temperature-dependent resistors and said electric heater for producing a signal representing the fluid flow rate,
   a second measurement circuit responsive to the signal from said third temperature-dependent resistor for producing a signal representing the fluid temperature, and
   a computer device responsive to the output signals of said first and second measurement circuits for carrying out a modification and a linearization of the output signal of said first measurement circuit, a temperature correction of a conversion constant in accordance with said signal representing the fluid temperature, and a multiplication of the signal obtained by said modification and linearization by said temperature corrected conversion constant.

3. A device as defined in claim 2, wherein said flow rate measuring pipe for passing the fluid to be measured is connected to a regulator of a liquified petroleum gas fuel supply system arranged between a fuel tank and a carburetor.

4. A device as defined in claim 3, wherein said regulator has a primary pressure reduction chamber and a second pressure reduction chamber, a main fuel supply system for said carburetor, and a slow fuel supply system of said carburetor.

5. A device as defined in claim 4, wherein the inlet of said flow rate measuring pipe is connected to the outlet of said primary pressure reduction chamber in said regulator, a first outlet of said flow rate measuring pipe is connected to the inlet of said secondary pressure reduction chamber in said regulator connected to said main fuel supply system of said carburetor, and a second outlet of said flow rate measuring pipe is connected to said slow fuel supply system of said carburetor.

* * * * *

UNITED STATES PATENT AND TRADEMARK OFFICE
CERTIFICATE OF CORRECTION

PATENT NO. : 4,475,388

DATED : October 9, 1984

INVENTOR(S) : Hisasi KAWAI et al

It is certified that error appears in the above-identified patent and that said Letters Patent is hereby corrected as shown below:

Column 1, line 11, read "(LPPG)" as --(LPG)--

Column 6, line 28, read "$V_{74}$" as --$V_\theta$--

Signed and Sealed this

Second Day of July 1985

[SEAL]

Attest:

DONALD J. QUIGG

Attesting Officer  Acting Commissioner of Patents and Trademarks